United States Patent [19]
Shimp

[11] Patent Number: 5,538,749
[45] Date of Patent: Jul. 23, 1996

[54] APPARATUS, SOUP CONCENTRATE AND PROCESS FOR DISPENSING SOUP

[75] Inventor: James L. Shimp, Eugene, Oreg.

[73] Assignee: H. J. Heinz Company, Pittsburgh, Pa.

[21] Appl. No.: 88,351

[22] Filed: Jul. 9, 1993

[51] Int. Cl.⁶ .............................. A23L 1/40; A23L 1/0522
[52] U.S. Cl. .................. 426/589; 426/578; 426/661; 99/357
[58] Field of Search ................... 426/589, 661, 426/578

[56] References Cited

U.S. PATENT DOCUMENTS

| | | | |
|---|---|---|---|
| 2,682,984 | 7/1954 | Melikian et al. | 226/46.6 |
| 3,185,348 | 5/1965 | Pollak et al. | 222/95 |
| 3,340,790 | 9/1967 | Simjian | 99/352 |
| 3,352,460 | 11/1967 | Herring | 222/129.4 |
| 3,578,126 | 5/1971 | Adams et al. | 194/16 |
| 3,662,927 | 5/1972 | Cocks | 222/146 |
| 3,676,154 | 7/1972 | Glasser et al. | 426/589 |
| 3,969,531 | 7/1976 | Cornelius | 426/319 |
| 4,094,446 | 6/1978 | Brutsman | 222/146 |
| 4,140,809 | 2/1979 | Glasser et al. | 426/589 |
| 4,174,789 | 11/1979 | West | 222/240 |
| 4,176,766 | 12/1979 | West | 222/238 |
| 4,189,071 | 2/1980 | West | 222/189 |
| 4,220,671 | 9/1980 | Kahn et al. | 426/321 |
| 4,291,066 | 9/1981 | Anema et al. | 426/589 |
| 4,322,018 | 3/1982 | Rutter | 222/83 |
| 4,357,861 | 11/1982 | Di Girolamo | 99/323.3 |
| 4,359,935 | 11/1982 | Murray | 99/331 |
| 4,361,176 | 11/1982 | West | 141/362 |
| 4,424,916 | 1/1984 | Pearson | 222/74 |
| 4,470,999 | 9/1984 | Carpiac | 426/506 |
| 4,478,357 | 10/1984 | Jenkins | 222/135 |
| 4,484,697 | 11/1984 | Fry, Jr. | 222/95 |
| 4,544,085 | 10/1985 | Frazer | 222/146.4 |
| 4,568,551 | 2/1986 | Seewi et al. | 426/99 |
| 4,603,793 | 8/1986 | Stern | 222/105 |
| 4,651,862 | 3/1987 | Greenfield, Jr. | 194/344 |
| 4,671,966 | 6/1987 | Giddey et al. | 426/589 |
| 4,748,902 | 6/1988 | Maurantonio | 99/326 |
| 4,779,761 | 10/1988 | Rudick et al. | 222/1 |
| 4,784,292 | 11/1988 | Johndrow et al. | 222/101 |
| 4,838,455 | 6/1989 | Hoeberigs | 221/82 |
| 4,860,923 | 8/1989 | Kirschner et al. | 222/1 |
| 5,102,015 | 4/1992 | Barnard et al. | 222/135 |
| 5,178,895 | 1/1993 | Duckworth | 426/589 |
| 5,264,235 | 11/1993 | Duckworth | 426/589 |

*Primary Examiner*—Jeanette Hunter
*Attorney, Agent, or Firm*—Burns, Doane, Swecker & Mathis

[57] ABSTRACT

A soup concentrate to be mixed with hot water to produce a soup product comprising a combination of a cooked starch slurry, a raw starch and at least one of food particles, flavoring and spices. The soup concentrate has Bostwick Value of between about 0.5 and about 5.0 cm at 40° F. to enable it to be mixed in and dispensed from a machine.

9 Claims, 11 Drawing Sheets

APPARATUS, SOUP CONCENTRATE AND PROCESS FOR DISPENSING SOUP

FIELD OF THE INVENTION

This invention relates to special apparatus for preparing and dispensing food products, and more particularly to special apparatus for preparing and dispensing individual servings of consumable hot soup from a refrigerated concentrate or base thereof, including the process and soup concentrate used therein. The invention also relates to a method for making soup concentrate.

BACKGROUND OF THE INVENTION

Equipment and processes used heretofore for the production of consumable hot soup suffer from various disadvantages and drawbacks because of the time and trouble required to operate them, lack of portion control and consequent inconsistent results. The apparatus, soup concentrate and process of the present invention overcome the foregoing. The apparatus and process according to the present invention are particularly characterized by the ease and speed of preparation and low cost thereof. Additional advantages are realized from portion control of the soup, reduced serving cost, consistency and improved quality, ease of clean up, reduced yield loss and improved safety. Other features and advantages of the invention will become apparent from the description that follows.

SUMMARY OF THE INVENTION

This invention relates to apparatus, soup concentrate and process for manufacturing and preparing a consumable hot soup product from a chilled concentrate thereof. To carry out the process, an amount of soup concentrate, generally in a chilled form approaching solidification, is introduced into a container where a limited amount is mixed with hot water or another hot liquid. The prearranged amounts are generally a 2 to 1 mix, that is, two parts water to one part soup of an acceptable flavor for the benefit of the consumer of the soup. Further, it is also designed so that a maximum amount of soup can be prepared with minimum trouble and delay. The invention also relates to a method for preparing the soup concentrate.

In accordance with one aspect of the present invention a process for mixing, heating and dispensing soup can include placing a quantity of chilled food intended to serve as a soup concentrate in a first container within a closed cabinet, maintaining the first container at a temperature within the range of 33° F. to 40° F., applying pressure to the soup concentrate within the first container sufficient to force a portion of the soup concentrate through a discharge outlet in a base of the first container and into a feed mechanism, the feed mechanism being adapted to open to permit the soup concentrate to enter a passage therethrough for receiving a measured amount of the soup concentrate and to close when sufficient soup concentrate is therein, forcing the soup concentrate to flow to a second container wherein it is mixed with hot water at a feed temperature between 190° F. and 205° F., mixing the soup concentrate and the heated water to produce a consumable hot soup, and discharging the hot soup from the second container for consumption.

In accordance with another aspect of the present invention, an apparatus for preparing a hot soup product from a soup concentrate and for dispensing the hot soup product can include a hot water source, a refrigerated soup concentrate container for storing soup concentrate, a mixing chamber connected to the water source and the soup concentrate container for receiving heated water from the water source and soup concentrate from the soup concentrate container, means for feeding a predetermined amount of heated water into the mixing chamber from the water source, means for feeding a predetermined amount of soup concentrate into the mixing chamber from the soup concentrate container, and opening and closing means associated with the nozzle for selectively opening and closing the outlet to permit consumable soup product to be dispensed from the mixing chamber. The mixing chamber can be provided with movable stirring means disposed for stirring and mixing together the soup concentrate and the heated water to produce a hot soup product. Also, the mixing chamber can include a nozzle through which the hot soup product can be dispensed.

An additional aspect of the present invention involves a soup concentrate comprising a Bostwick Value of between about 0.5 to about 5.0 cm at 40° F.

Another aspect of the present invention involves a soup concentrate comprising cooked starch and from about 1 to about 10 weight percent of raw starch, based on the total weight of the soup concentrate.

In accordance with another aspect of the present invention, a process for manufacturing a soup concentrate by heating a first aqueous raw starch slurry under conditions sufficient to increase the viscosity of the aqueous starch slurry to at least about 85% of its maximum viscosity, cooling the first starch slurry to a temperature below about 100° F. and adding from about 1 to about 10 weight percent of raw starch, based on the total weight of the soup concentrate, to the first starch slurry to form a soup concentrate.

BRIEF DESCRIPTION OF THE DRAWING FIGURES

The foregoing objects and advantages, in addition to others, will be more apparent with reference to the accompanying drawing figures in which like elements bear like reference numerals and wherein.

DETAILED DESCRIPTION OF THE PREFERRED EMBODIMENTS

Figure 1:
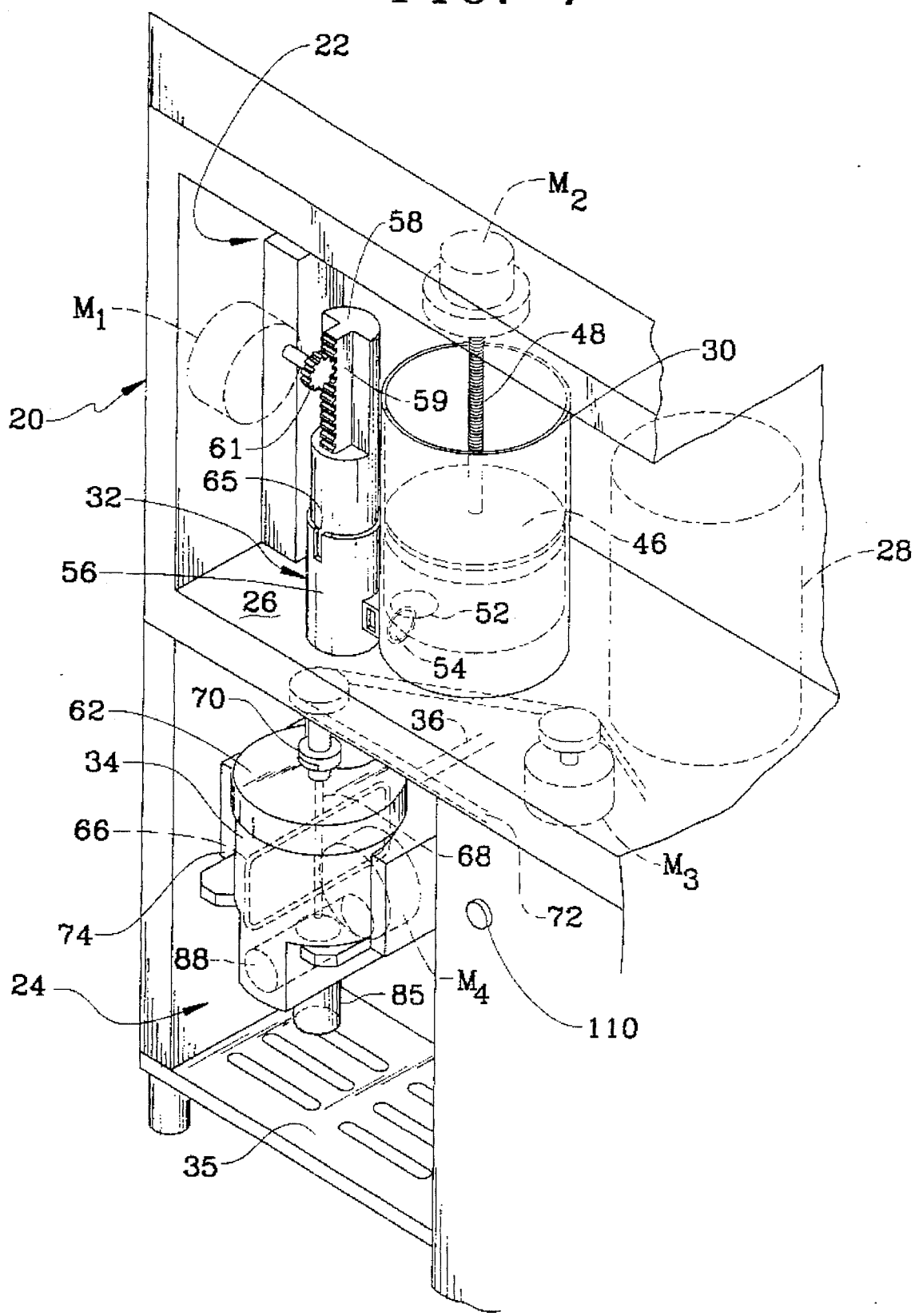
FIG. 1 is a perspective view of the soup preparation and dispensing apparatus according to one embodiment of the invention illustrating the various component parts of the apparatus.

With reference initially to FIG. 1, the apparatus according to one embodiment of the invention includes a cabinet 20 provided with an upper chamber 22 and a lower chamber 24. The upper and lower chambers 22, 24 can be separated by a shelf or wall 26.

The upper chamber 22 is adapted to house and enclose two main components of the apparatus, namely a refrigerated soup concentrate container 30 for storing soup base or soup concentrate that is in a generally chilled form, and a feed mechanism 32 for feeding soup concentrate received from the soup concentrate container 30. The upper chamber 22 is preferably refrigerated or otherwise cooled so that the temperature in the upper chamber is at a level sufficient to maintain the temperature of the soup concentrate in the container 30 within a range of about 33° F. to about 45° F., preferably about 33° F. to about 40° F.

Located in the lower chamber 24 of the cabinet or housing 20 is a mixing chamber 34. The mixing chamber 34 is disposed above a tray 35 that is adapted to support a cup or the like for receiving soup dispensed from the mixing chamber 34. The apparatus also includes a heated water container 28 for storing heated water. The water container 28 is preferably positioned exteriorly of the upper chamber 22 and can, for example, be mounted on the rear portion of the cabinet 20.

Although not illustrated in FIG. 1, the upper chamber 22 will typically be completely enclosed so that the soup concentrate container 30 and the feed mechanism 32 are not visible from the exterior during normal use. However, the cabinet 20 is preferably designed to permit access to the upper chamber 22, and thus the container 30 and feed mechanism 32 enclosed within the upper chamber 22, when necessary and as desired. The lower chamber 24 can be open or can be provided with an openable and closable door (not shown).

The water tank 28 is connected to the mixing chamber 34 by way of a pipe 36, only a portion of which is visible in FIG. 1. As can be seen from the schematic illustration of FIG. 11, a valve 38 can be positioned at an appropriate place along the pipe 36 to control the flow of hot water from the water container 28 to the mixing chamber 34. Preferably, the water container 28 is provided with a suitable heating device 40 for heating the water in the water container 28 and maintaining the water at a temperature within a predetermined range of approximately 190° F. to approximately 205° F. The water tank 28 can also be provided with a float valve 42 for maintaining a desired level of water within the water container 28. The water container 28 can be connected to a suitable source of water by way of a pipe 44. Thus, as can be seen, water flows into the top portion of the tank 28 by way of the pipe 44 while hot water flows out of the bottom of the tank through the pipe 36.

Figure 4:
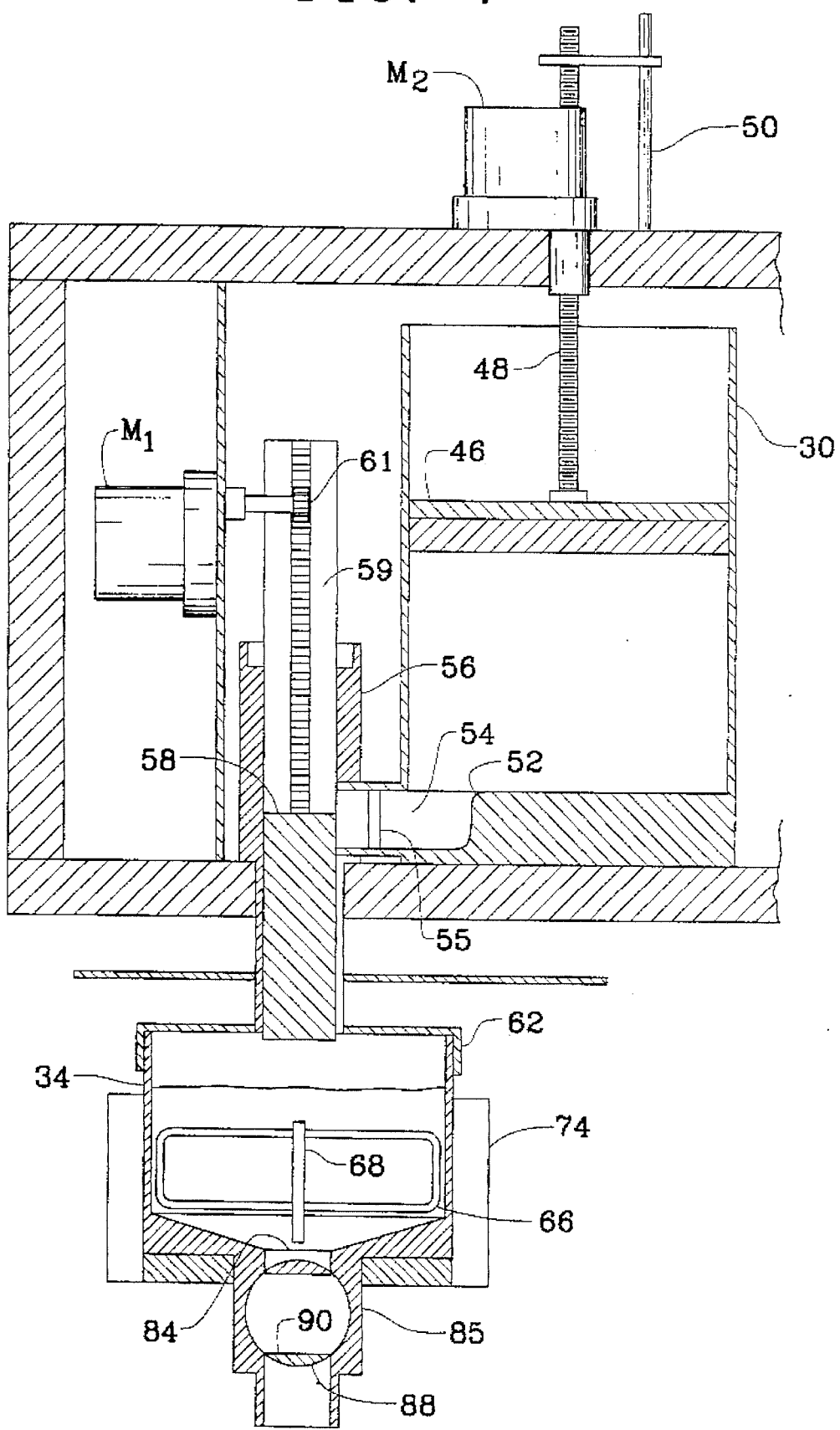
FIG. 4 is a cross-sectional view of a portion of the apparatus along the section line 4—4 in FIG. 3 illustrating the soup concentrate container, the feed mechanism and the mixing chamber.

With reference once again to FIG. 1, disposed within the soup concentrate container 30 is a generally circular flat movable plate member 46 which is connected to a screw threaded rod 48. The screw threaded rod 48 is connected to a motor $M_2$ which, when in operation, moves the rod 48 and the connected plate member 46 in a vertical manner within the soup concentrate container 30. The screw threaded rod 48 can be a rack and pinion drive, a stepper motor drive, or another suitable arrangement. As can be seen in FIG. 4, for example, a guide shaft 50 is positioned on the exterior of the cabinet and is operatively connected to the rod 48 to help guide the rod 48 and the attached plate member 46 in a vertical manner during movement.

The soup concentrate container 30, which is preferably made of a plastic material such as high density polyethylene (HDPE) or similar material, is adapted to receive a quantity of soup concentrate or soup base. In accordance with a preferred embodiment, the soup concentrate is packaged in a flexible pouch and frozen. Prior to being loaded into the soup concentrate container 30, the bag of frozen soup concentrate can be thawed slightly to a chilled form having a temperature within a range of about 33° F. to about 45° F., preferably about 33° F. to 40° F. In a preferred embodiment, the soup concentrate has a Bostwick value of between about 0.5 to 5.0 cm at 40° F. Through suitable operation of the motor $M_2$, the round flat plate member 46 can be moved upwardly above the top rim of the soup concentrate container 30 for allowing the flexible bag containing the soup concentrate or soup base to be placed inside the soup concentrate container 30. The refrigerated nature of the upper chamber 22 allows the soup concentrate to be maintained within the aforementioned temperature range of about 33° F. to about 45° F., preferably about 33° F. to 40° F. As an alternative to cooling the entire upper chamber 22, a suitable cooling device could be associated with the soup concentrate container 30 to achieve the same result.

The bottom of the soup concentrate container 30 is provided with a discharge outlet 52 for allowing soup concentrate to flow from the soup concentrate container 30 to the feeding mechanism 32. A transfer chamber 54 can be disposed between the discharge outlet 52 in the soup concentrate container 30 and the feeding mechanism 32. Also, a knife valve 55 can be positioned in the transfer chamber 54 to isolate the soup concentrate container 30 from the feeding mechanism 32 in order to permit the soup concentrate in the container 30 to be changed. The transfer chamber 54 can be structurally connected to and form a part of the soup concentrate container 30. The soup concentrate container 30 is preferably removable from the cabinet 20 and the knife valve 55 allows access through the transfer chamber 54 to be cut-off so that the soup concentrate 30 container can be removed from the cabinet 20.

Figure 2:
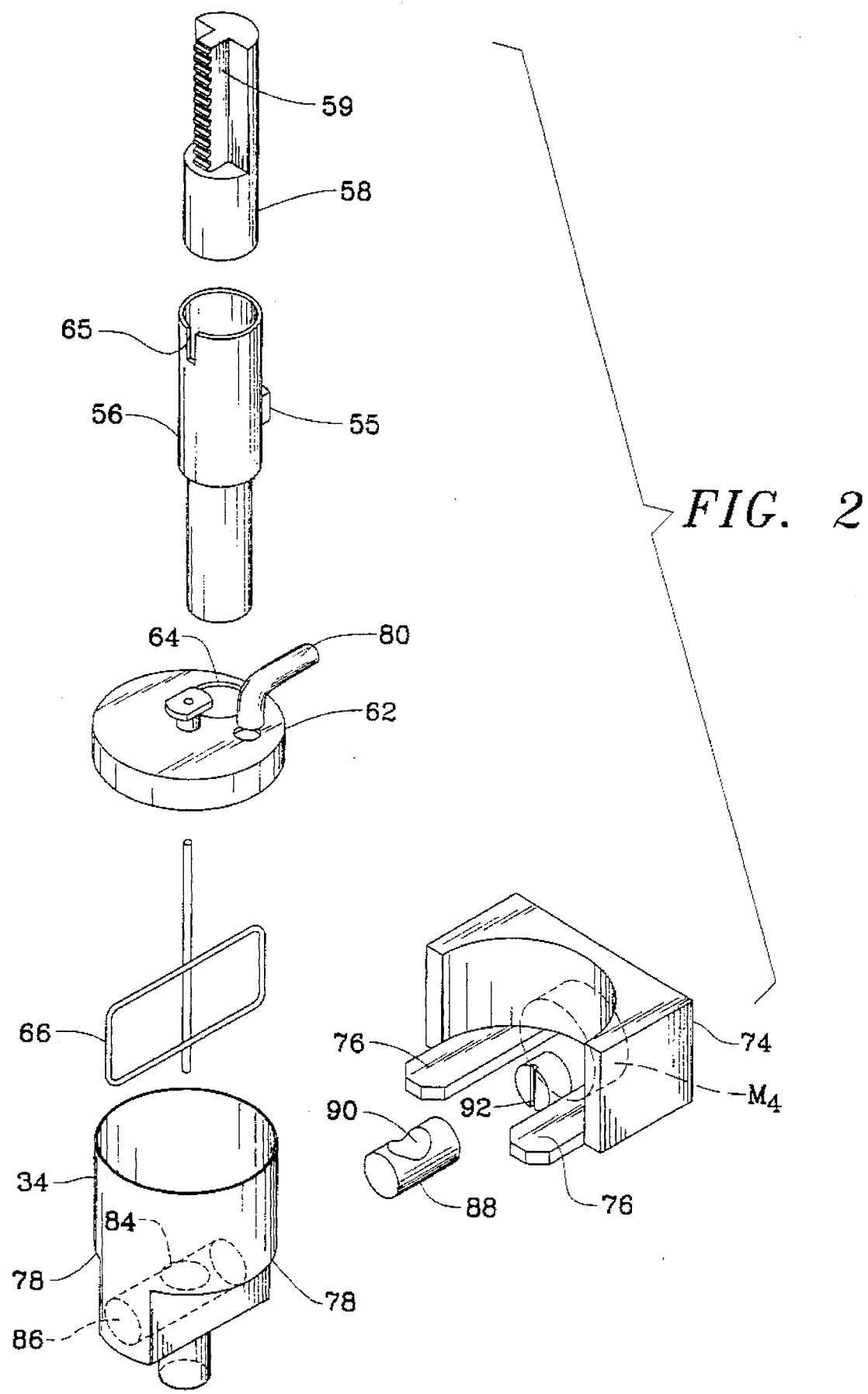
FIG. 2 is an exploded view of various component parts of the soup preparation and dispensing apparatus.

With reference to FIG. 2, the feeding mechanism 32 includes a hollow, elongated cylinder 56 for receiving a feed member 58 in the form of a generally cylindrically shaped piston. As perhaps best illustrated in FIG. 4A, the interior of the cylinder 56 communicates with the transfer chamber 54 so that soup concentrate from the soup concentrate container 30 can be introduced into the interior of the cylinder 56.

Figure 12:
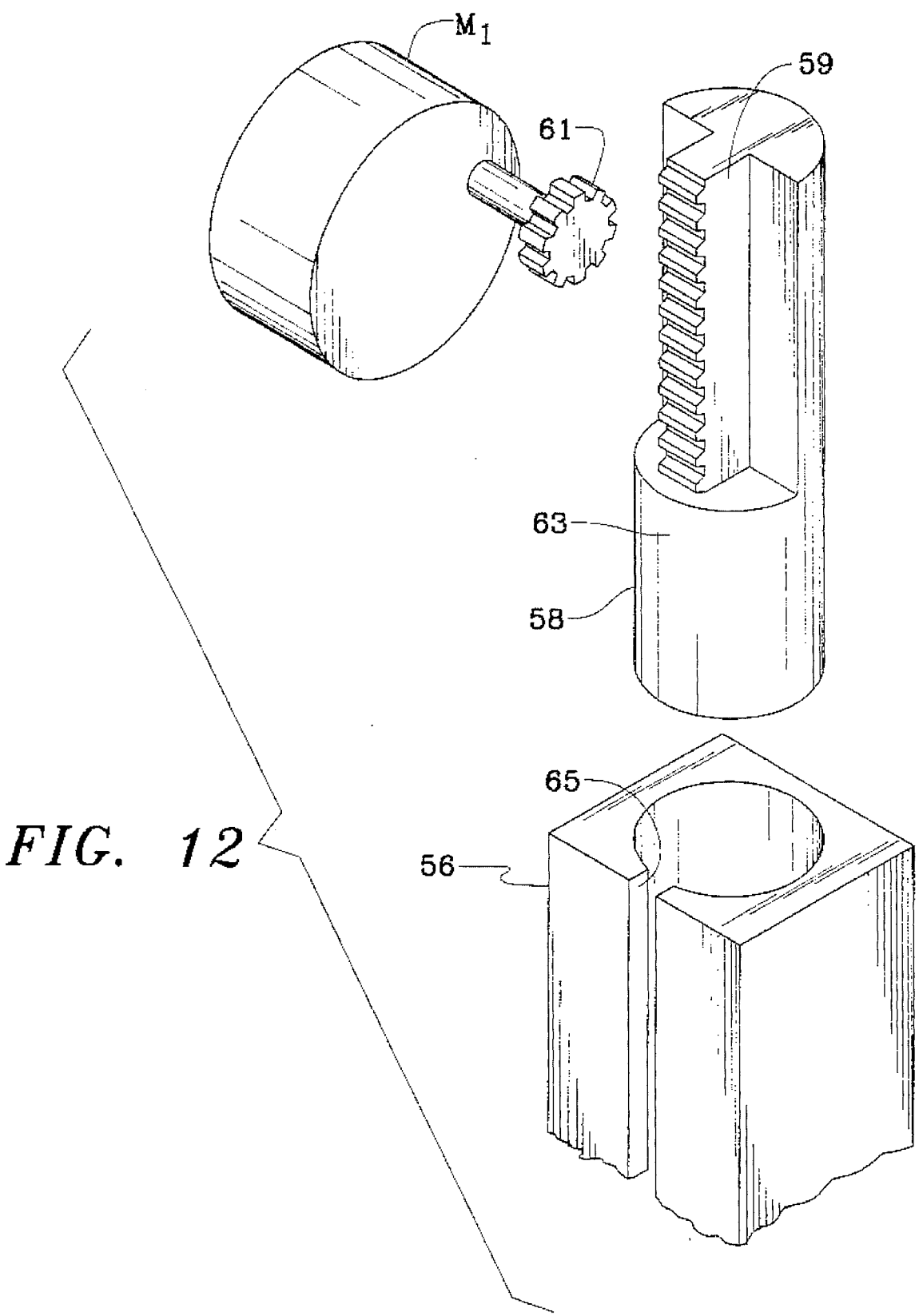
FIG. 12 is an exploded perspective view of the rack and pinion arrangement for driving the feed mechanism.

With reference to FIG. 12, the top portion of the feed member 58 is provided with a rack 59 that engages a pinion gear 61 connected to a drive motor $M_1$. The rack 59 preferably extends outwardly slightly beyond the outer peripheral surface of the cylindrical bottom portion 63 of the feed member 58. The cylinder 56 is provided with a groove 65 that extends along a portion of the length of the cylinder 56 as seen in FIG. 1. During up and down movement of the feed member 58, the rack 59 on the upper portion of the feed member 58 rides in the groove 65 formed in the cylinder 56.

Through suitable operation of the drive motor $M_1$, the feed member 58 can be driven in an up and down direction within the hollow cylinder 56 to feed soup concentrate into the mixing chamber 54. The drive motor $M_1$ is preferably provided with a slip clutch. In that way, the feed member 58 can be driven upwardly until it comes into contact with the top wall of the upper chamber 22. Likewise, the feed member 58 can be driven in a downward direction until the rack 59 on the upper portion of the feed member 58 comes into contact with the bottom of the groove 65 formed in the cylinder 56.

It is to be noted that in the FIG. 12 illustration, the cylinder 56 has a rectangular configuration rather than the cylindrical configuration shown in the various other drawing figures. Such an illustration is merely intended to indicate that the cylinder 56 can be shaped and configured in various different ways.

With reference to FIG. 2, it is to be noted that the cylinder 56 can be provided with an inlet 55 that communicates with the transfer chamber 54. That inlet 55 can be located on a side of the cylinder 56 opposite the groove 65. As also shown in FIG. 2, the mixing chamber 34 is provided with a lid 62. A hole 64 is disposed in the lid 62 to receive the lower end of the cylinder 56 which forms a part of the feeding mechanism 32. In that way, the interior of the hollow cylinder 56 communicates with the interior of the mixing chamber 34 as can be clearly seen in FIGS. 3, 4, 4A and 4B. A feed pipe 80, which is connected to the pipe 36 leading to the water tank 28, is also disposed in the lid 62 to introduce hot water into the mixing chamber 34.

Figure 3:
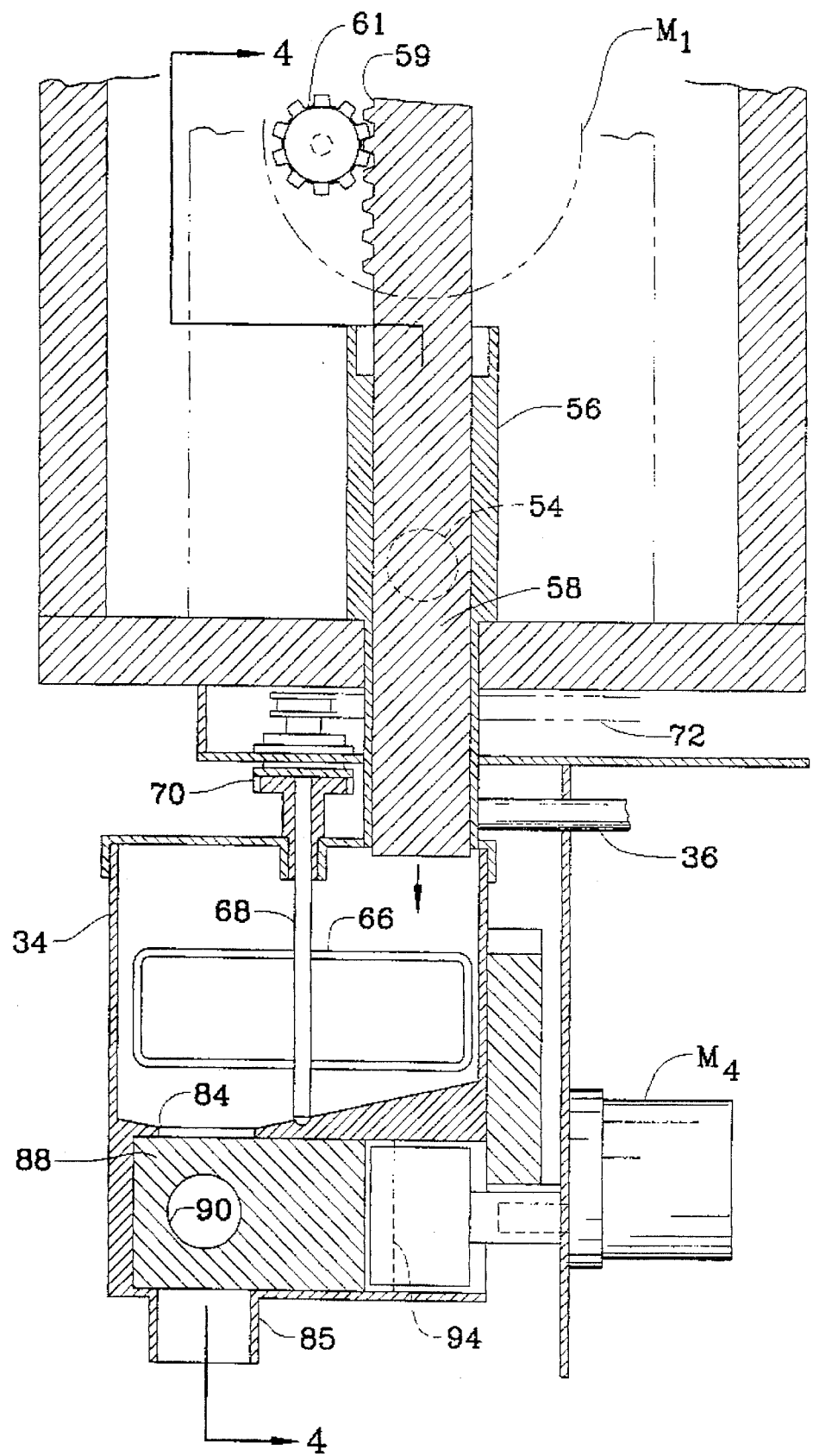
FIG. 3 is a cross-sectional view of a portion of the apparatus shown in FIG. 1 illustrating the mixing chamber and the feed mechanism for the soup concentrate.

Disposed within the mixing chamber 34 is a stirring member 66 for stirring the contents of the mixing chamber 34. A rod 68 is connected to the stirring member 66 and extends freely through a hole in the lid 62. As best illustrated in FIGS. 1 and 3, a pulley mechanism 70 is connected to the rod 68 and is adapted to receive an endless belt 72 which also passes around the driven element of a motor $M_3$. Operation of the motor $M_3$ results in rotation of the stirring member 66 within the mixing chamber 34 to thereby thoroughly stir and mix the contents in the mixing chamber 34.

As seen in FIG. 2, the mixing chamber 34 is adapted to be mounted on a holder block 74 which is provided with inwardly directed ledges 76. The lower portion of the mixing container 34 is recessed on opposite sides to provide shoulders 78 that rest on the ledges 76 of the holder block 74. The mixing chamber 34 can be removably mounted on the holder block 76 to permit the mixing chamber 34 to be removed from the lower chamber 24 for purposes of cleaning when the soup concentrate is changed from one type to another (e.g., from a broth soup to a cream soup).

The bottom of the mixing chamber 34 can be sloped as seen in FIGS. 3, 4, 4A and 4B, to facilitate the discharge of the soup from the mixing chamber 34. In addition, the bottom of the mixing chamber 34 can be outfitted with a nozzle 85 through which can be discharged the contents in the mixing chamber 34. An outlet opening 84 in the bottom of the mixing chamber 34 communicates with the passage that extends through the nozzle 85. Disposed within the nozzle 85 and below the outlet opening 84 is a generally cylindrically shaped hollow portion 86 which is oriented generally perpendicularly with respect to the passage extending through the nozzle 85. The hollow portion 86 is adapted to receive a generally cylindrically shaped ball valve 88.

Figure 4A:
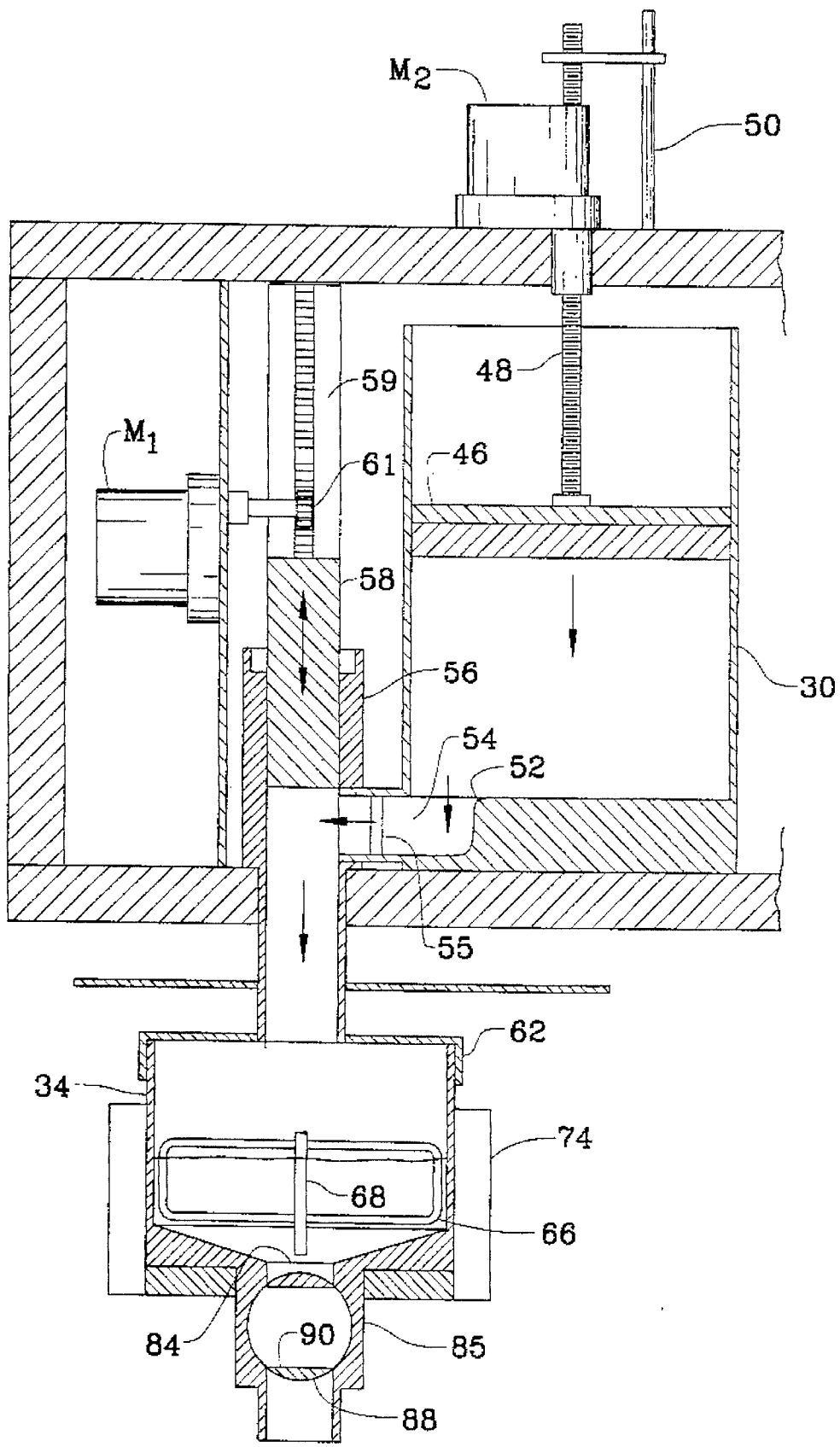
FIG. 4A is a cross-sectional view similar to FIG. 4 showing the path of flow of the soup concentrate from the soup concentrate container and into the feed mechanism.
Figure 4B:
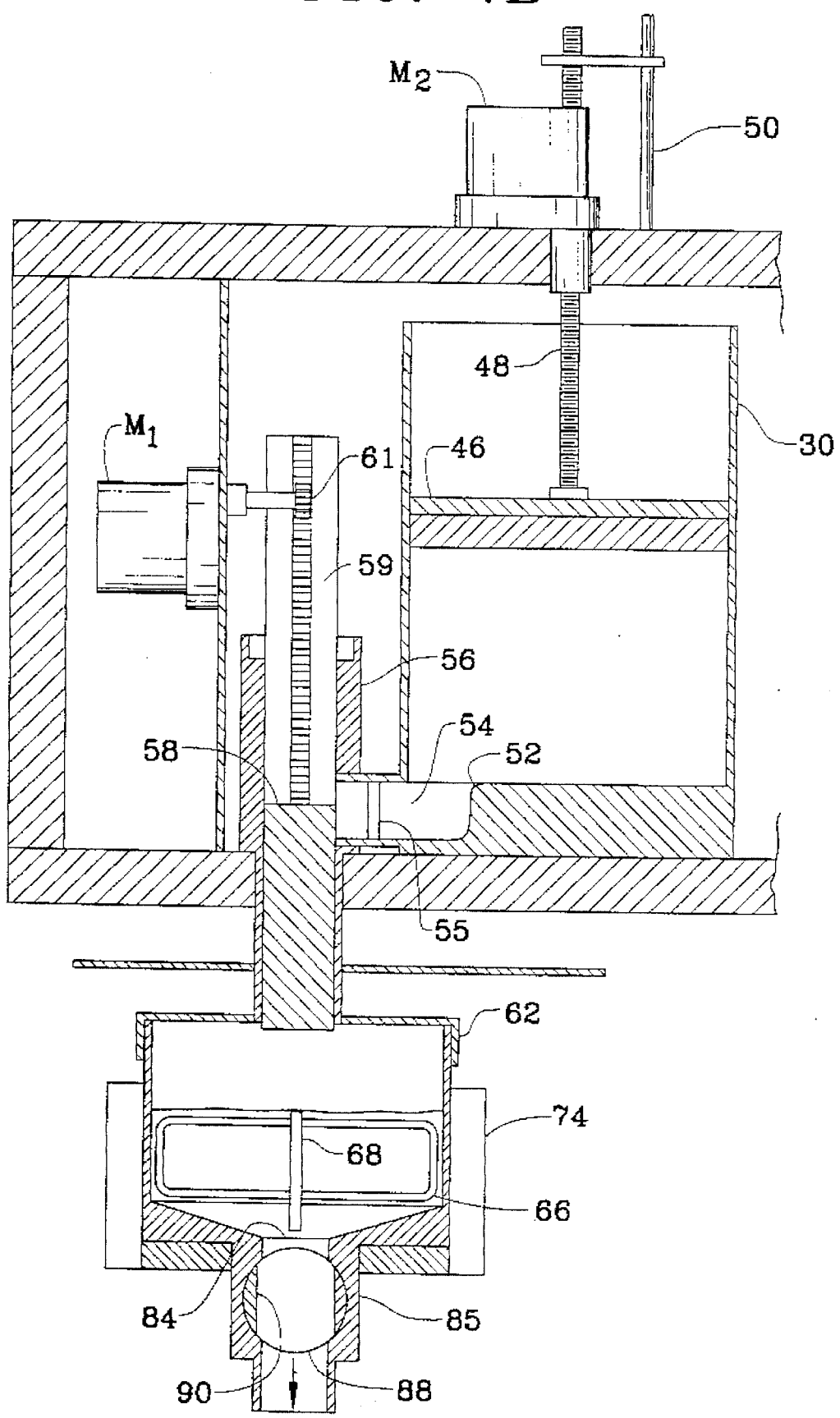
FIG. 4B is also a cross-sectional view similar to FIG. 4 illustrating the feed mechanism when the soup concentrate is fed into the mixing chamber.
Figure 5:
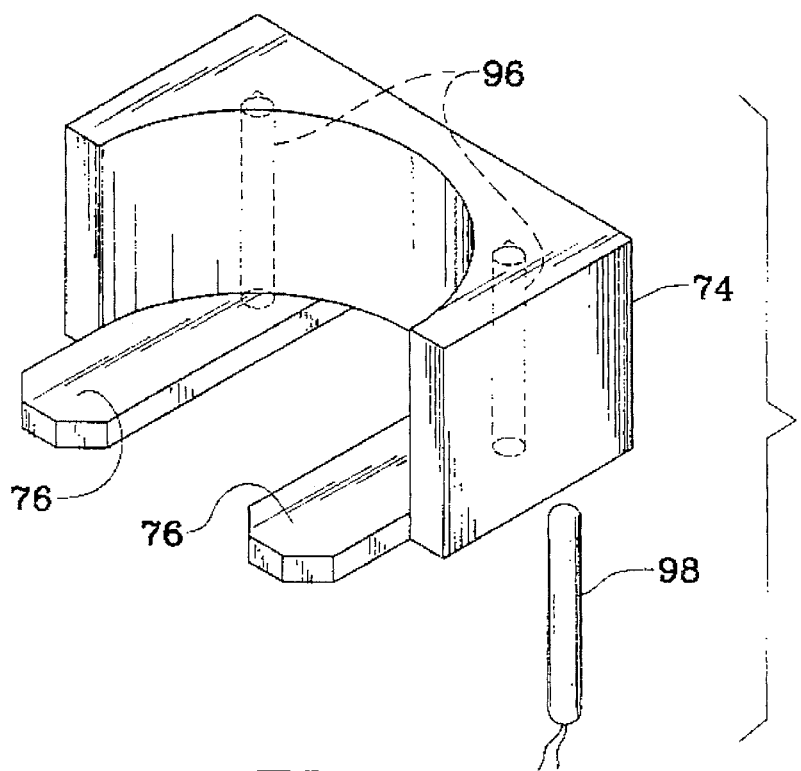
FIG. 5 is a perspective view of the heating block that holds the mixing chamber.
Figure 6:
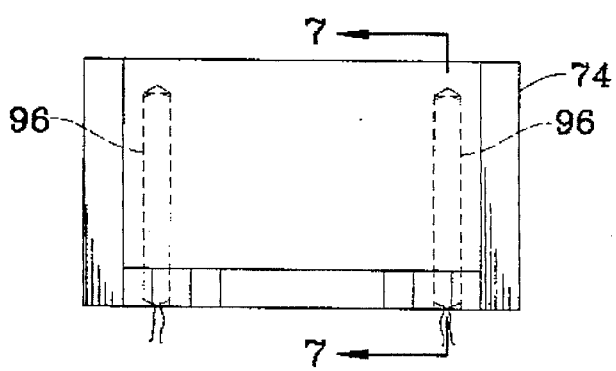
FIG. 6 is a front elevational view of the heating block of FIG. 5.
Figure 7:
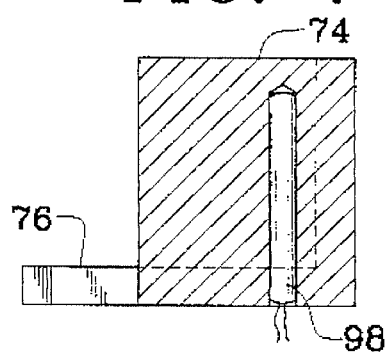
FIG. 7 is a cross-sectional view along the section line 7—7 in FIG. 6 showing a heating element in the heating block.
Figure 8:
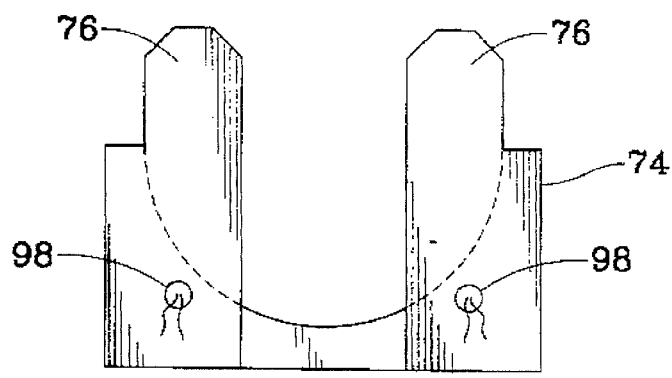
FIG. 8 is a bottom view of the heating block shown in FIG. 5.

As seen in FIG. 2, the cylindrical ball valve 88 is provided with a through hole 90 which extends generally perpendicular to the longitudinal axis of the cylindrical ball valve 88. The cylindrical ball valve 88 is adapted to selectively open and close the nozzle 85 in the mixing tank 34 to either permit or prevent the contents in the mixing chamber 34 from being dispensed therefrom. The selective opening and closing of the discharge nozzle 85 can achieved by rotating the cylindrical ball valve 88 between one position in which the through hole 90 in the ball valve 88 is aligned with the passage through the nozzle 85 as seen in FIGS. 4B and another position in which the through hole 90 in the cylindrical ball valve 80 is out of alignment with the passage extending through the discharge nozzle 85 as seen in FIGS. 4 and 4A. When the ball valve 88 is in the former position, flow through the nozzle 85 is permitted whereas when the ball valve is in the latter position, flow through the nozzle 85 is prevented.

The rotation of the cylindrical ball valve 88 in the foregoing manner can be achieved through operation of a suitable motor $M_4$ which may be secured to the holder block 74. The front face of the drive output from the motor $M_4$ can be provided with a slot 92 as seen in FIG. 2 for interacting with a rib 94 extending from the end face of the cylindrical ball valve 88 as seen in FIG. 3. Thus, through operation of the motor $M_4$, the cylindrical ball valve 88 can be rotated through a rotation angle of 90° from the position illustrated in FIGS. 4 and 4A to the position shown in FIG. 4B, and vice versa.

With reference to FIGS. 5–8, the holder block 74 can be outfitted so that it also serves the function of heating the mixing chamber 34 and thus the contents in the mixing chamber 34. In that way, the temperature of the contents in the mixing chamber 34 can be maintained at a temperature within a predetermined desired range. The heating arrangement can include several recesses 96 formed in the holder block 74 for receiving individual heating elements 98. Although not shown, it is to be understood that the heating elements 98 will be connected to a suitable power source.

Figure 11:
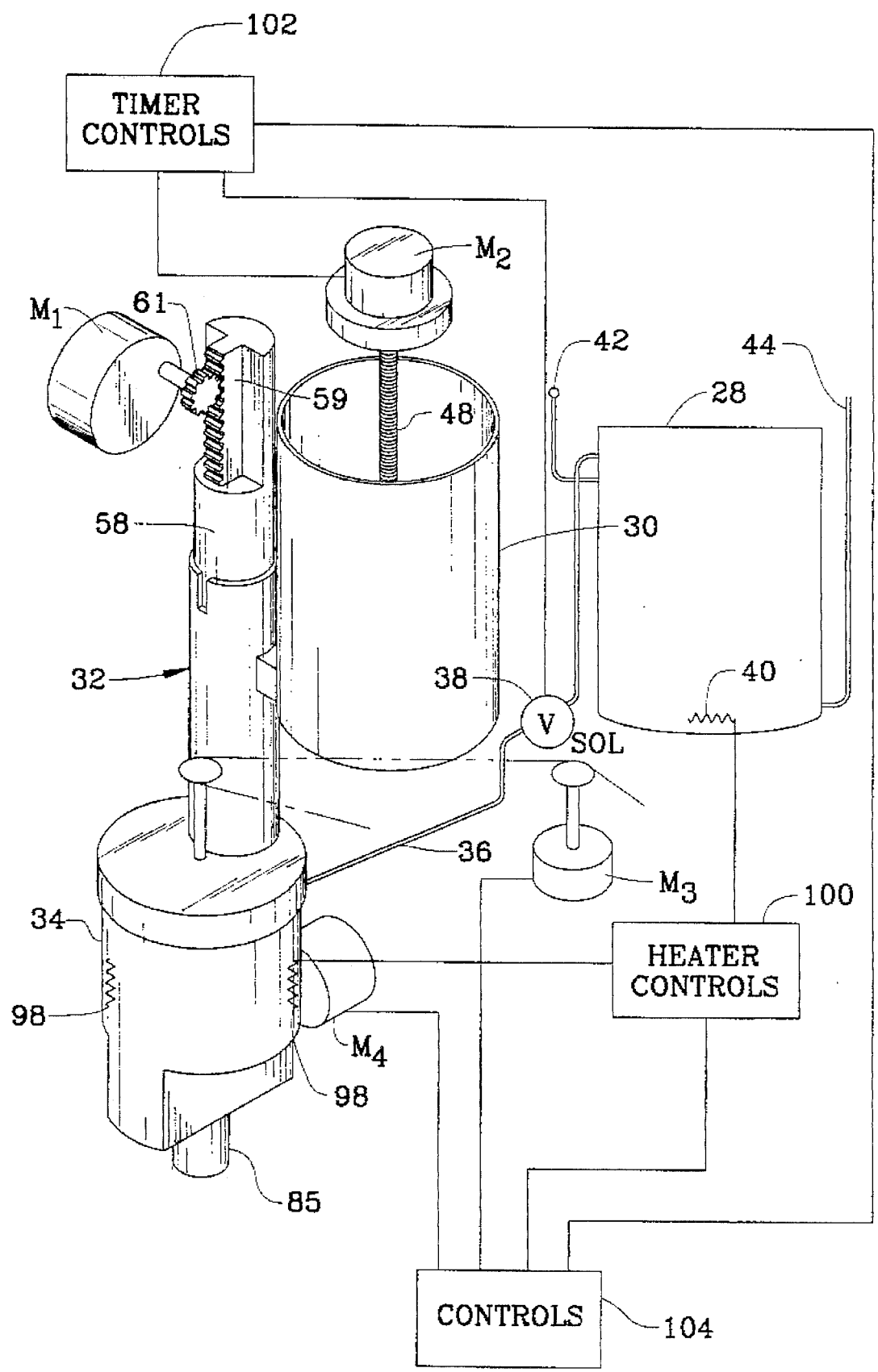
FIG. 11 is a schematic illustration of the controls that can be used to operate the various component parts of the soup preparation and dispensing apparatus.

FIG. 11 schematically illustrates several controls associated with the soup preparing and dispensing apparatus for controlling various parts of the apparatus. The controls include heater controls 100 for controlling the heating device 40 associated with the water container 28 and the heating elements 98 associated with the mixing chamber 34. FIG. 11 illustrates the heating elements 98 being directly associated with the mixing chamber rather than being disposed in the holder block 74 as shown in FIGS. 5–8. It is to be understood, however, that the heater controls 100 could also be connected to the heater elements 98 disposed in the holder block illustrated in FIGS. 5–8.

Timer controls 102 are also provided to control the timing operation of the motor $M_1$ associated with the feed mechanism 32, the motor $M_2$ associated with the plate member 46, and the valve 38 which meters the amount of hot water fed to the mixing chamber 34 from the water container 28. Additional controls 104 can be included to control the motor $M_3$ which drives the stirring member 66 in the mixing chamber 34, to control the motor $M_4$ which rotates the cylindrical ball valve 88 for purposes of controlling the discharge of the contents from the mixing chamber 34, to control the heater controls 100, and to control the timer controls 102.

Having described the features of the apparatus, a description of the operation will be set forth. As noted above, the soup concentrate that is to be placed in the soup concentrate container 30 can be stored in a flexible bag. The bag can then be opened prior to placement in the container 30 or can be outfitted with a suitable cap or the like that can be removed prior to placement of the bag in the container 30. Alternatively, a desired amount of soup concentrate can be directly emptied into the cylindrical container 30, thereby alleviating the need for the flexible bag.

To operate the apparatus, a button 110 (see FIG. 1) on the front of the cabinet 20 is pushed. At the time the button 110 is actuated, the mixing chamber 34 is preferably already filled with the appropriate quantity of hot water which is maintained at a temperature of about 190° F. and about 205° F. by the heating elements 98. The filling of the mixing chamber 34 with hot water preferably occurs at the completion of the prior dispensing operation in order to maintain the interior of the mixing chamber 34 in a wet state and thereby prevent the drying of residual soup from the prior mixing operation on the interior walls of the mixing chamber 34.

FIG. 4 illustrates the mixing chamber 34 with the heated water located therein. As illustrated, the feed member 58 is located in its downwardmost position, thereby sealing off the transfer chamber 54 to prevent the flow of soup concentrate into the cylinder 56. When the button 110 is actuated, the motor $M_1$ is made operational and the feed member 58 begins to move upwardly under the control of the appropriate timer control 102 to an uppermost position illustrated in FIG. 4A. When the feed member 58 reaches its uppermost position illustrated in FIG. 4A, the transfer chamber 54 is completely open with respect to the interior of the cylinder 56 to permit soup concentrate to flow into interior of the cylinder 56. As noted previously, the uppermost position of the feed member 58 is preferably reached when the feed member 58 contacts the top wall of the upper chamber 22.

When the upwardly moving feed member 58 reaches a position just short of the uppermost position shown in FIG. 4A, a sensor or switch (not shown) associated with the motor $M_2$ is actuated. Thus, the motor $M_2$ begins operating under the control of the appropriate timer control 102. In that way, the plate member 46 is driven in the downward direction as seen in FIG. 4A to apply a compressive force to the soup concentrate in the soup concentrate container 30. Thus, the plate member 46 forces soup concentrate through the transfer chamber 54 and into the interior of the cylinder 56. The appropriate timer control 102 is designed to operate the motor $M_2$ for a period of time sufficient to force a predetermined amount of soup concentrate into the cylinder 56. Once the predetermined quantity of soup concentrate has been forced into the cylinder 56, the motor $M_2$ ceases operation. In addition, the motor $M_1$, which may have been turned off when the feed member 58 reached the uppermost position shown in FIG. 4A, causes the feed member 58 to move downwardly under the control of the appropriate timer control 102. In that way, the feed member 58 forces the soup concentrate into the mixing chamber 34.

The viscosity of the soup concentrate is dependent on the arrangement that dispenses the soup concentrate into the mixing chamber. The soup concentrate should have a low enough viscosity to allow the soup concentrate to flow from the soup concentrate container 30 into the mixing chamber, and yet have a high enough viscosity such that it does not flow out of the soup concentrate container 30 too quickly, thereby allowing a metered or predetermined amount of soup concentrate to be dispensed into the mixing chamber 34. In a preferred embodiment, wherein the arrangement for dispensing the soup concentrate into the mixing chamber 34 is a plate member 46 applying compressive force, the Bostwick Value (viscosity) of the soup concentrate is between about 0.5 to 5.0 cm at 40° F.

As noted, the timer controls 102 associated with the motors $M_1$, $M_2$ control the operation of the motors $M_1$, $M_2$ so that the plate member 46 is moved a distance sufficient to force a predetermined amount of soup concentrate through the transfer chamber 54 and into the cylinder 56, whereupon the feed member 54 moves downwardly and feeds the predetermined quantity of soup concentrate into the mixing chamber 34. The predetermined quantity of soup concentrate is preferably selected for being mixed with heated water in a ratio of two parts water to one part soup concentrate.

As can be seen from FIG. 4B, the downward movement of the feed member 58 closes and seals off the transfer chamber 54 from the interior of the cylinder 56 so that no additional soup concentrate can be introduced into the cylinder 56. Thus, the operation of the motors $M_1$, $M_2$ and the resulting movement of the plate member 46 and the feed member 58 are coordinated to allow a metered or predetermined amount of soup concentrate to enter the cylinder and to thereafter prevent additional soup concentrate from entering the cylinder 56, thereby helping to ensure consistency in taste between successive servings of soup.

After the soup concentrate is introduced into the mixing chamber by the feed member 58, the appropriate control 104 initiates operation of the motor $M_3$ to thereby rotate the stirring member 66. Of course, operation of the motor $M_3$ can commence before or during feeding of the soup concentrate into the mixing chamber 34. The rotation of the stirrer member 66 can be performed for a period of time and at sufficient speed after the soup concentrate is introduced into the mixing chamber to mix the hot water/soup concentrate. In a preferred embodiment, the soup concentrate and water are mixed by the stirrer member 66 for a period of about 9 to 10 seconds. The mixing of the relatively cold soup concentrate having a temperature within the range of about 33° F. and about 45° F. (preferably 33° F. to 40° F.), and the relatively hot water having a temperature within a range of about 190° F. to about 205° F., produces a hot soup product having a temperature within the range of about 165° F. to about 175° F., more preferably about 170° F. The heating elements 98 help maintain the temperature of the contents in the mixing chamber 34 within the aforementioned range during the mixing operation.

Once the mixing of the soup concentrate and the heated water is complete or possibly during the last second of mixing by the stirrer member 66, the control 104 associated with the motor $M_4$ initiates operation of the motor $M_4$ for a time period sufficient to cause the cylindrical ball valve 88 to rotate from the closed position shown in FIG. 4A to the open position depicted in FIG. 4B. As a result, the hot soup product at a temperature between about 165° F. and about 175° F., preferably 170° F., is discharged through the nozzle 85 into a cup or other container placed on the tray 35.

Quite advantageously, the system according to the present invention can operate under a cycle time of about 15 seconds to about 20 seconds. That is, mixed hot soup can be dispensed from the mixing chamber 34 within 15–20 seconds of the time when the feed member 58 initially begins moving upwardly. The aforementioned cycle time includes approximately five seconds for the feed member 58 to be raised, approximately five seconds for the feed member 58 to be lowered in order to force the soup concentrate into the mixing chamber 34, and approximately ten seconds of mixing time in the mixing chamber 34 by the stirrer member 66. The cylindrical valve 88 can be opened during the last second or so of mixing.

In a preferred embodiment, the soup is ready to consume about 30 seconds to about 5 minutes after mixing with the hot water. Preferably, the soup is ready to consume after about 1 minute to about 3 minutes, more preferably after about 1 minute to about 2 minutes. Thus, it is preferable that the soup be allowed to sit for a short period of time after it is dispensed from the mixing chamber 34.

Upon the passage of a time period sufficient to allow the entire contents of the mixing chamber 34 to be discharged therefrom, operation of the motor $M_4$ is once again initiated to return the cylindrical ball valve 88 to its closed position shown in FIG. 4A. Once the motor $M_4$ is turned off, the appropriate timer control 102 for controlling the valve 38 in the pipe that extends between the water container 28 and the mixing chamber 34 is actuated. As noted above, two parts of water are mixed with one part of soup concentrate to form the soup product. Thus, the timer control 102 opens the valve 38 for a period of time sufficient to feed the necessary amount of heated water to the mixing chamber 34. When sufficient water has been fed to the mixing chamber 34, the valve 38 is closed. The apparatus is now ready for the next mixing and dispensing operation upon actuation of the button 110.

When the soup concentrate in the soup concentrate container 30 is empty, or when it is desired to change the soup concentrate, the knife valve 55 can be actuated. The knife valve 55 closes off communication between the container 30 and the cylinder 56.

Figure 9:
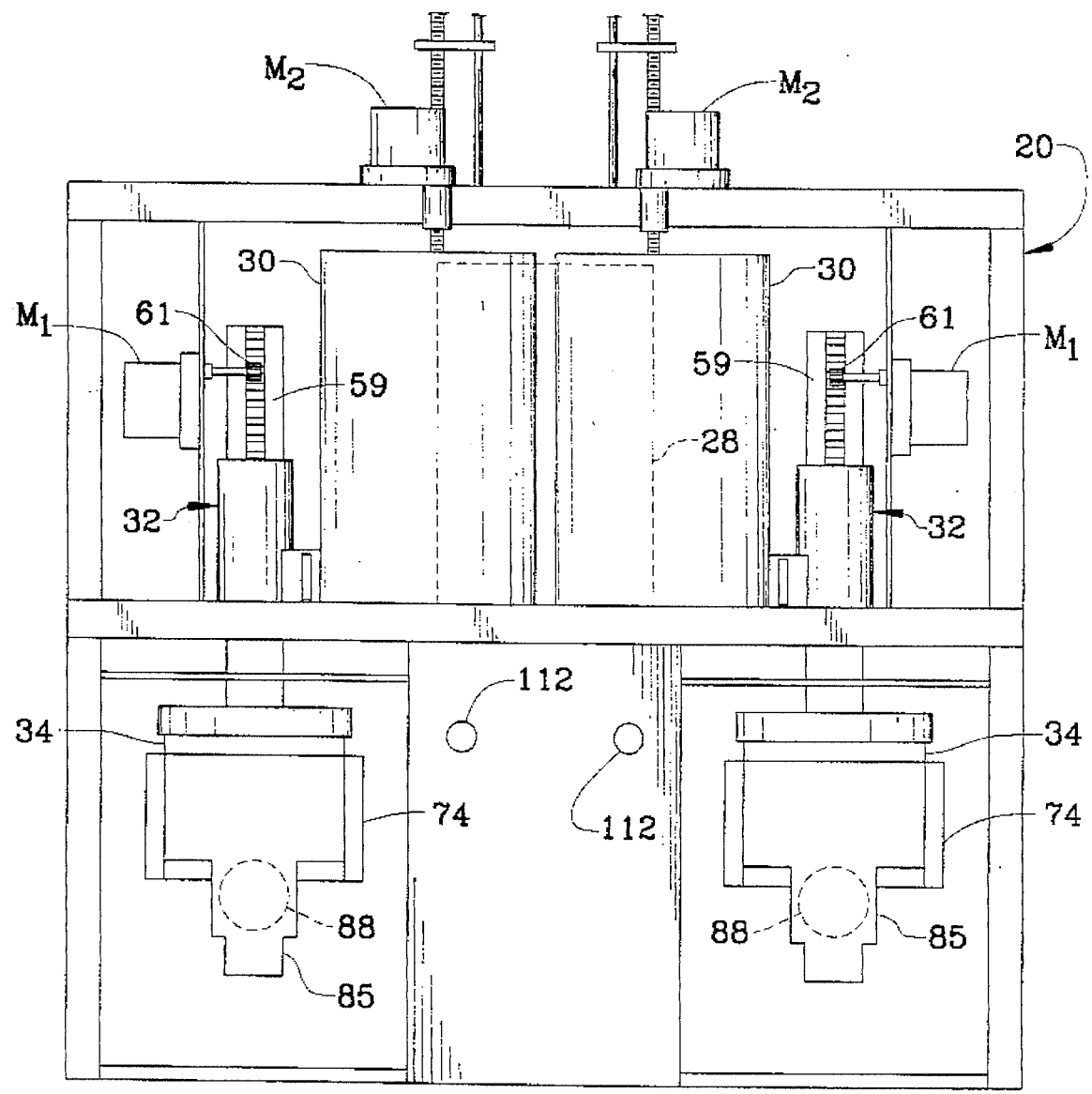
FIG. 9 is a front elevational view of a soup preparation and dispensing apparatus in accordance with another embodiment of the present invention.

In accordance with another aspect of the invention, FIG. 9 illustrates a dual soup preparation and dispensing apparatus for preparing and dispensing hot consumable soup at two separate stations. The apparatus according to this embodiment may be particularly useful for separately preparing and dispensing two different soup products or flavors. For example, chicken noodle soup can be prepared in and dispensed from one station while cream of broccoli is prepared in and dispensed from the other station. Each half of the dispensing apparatus depicted in FIG. 9 can include all of the same features of the apparatus illustrated in FIG. 1. However, if desired, a single common heated water tank 28 can be provided for feeding hot water to each of the mixing chambers 34. Two separate valves can also be provided to individually control the quantity of hot water fed to each of the mixing chambers 34.

Figure 10:
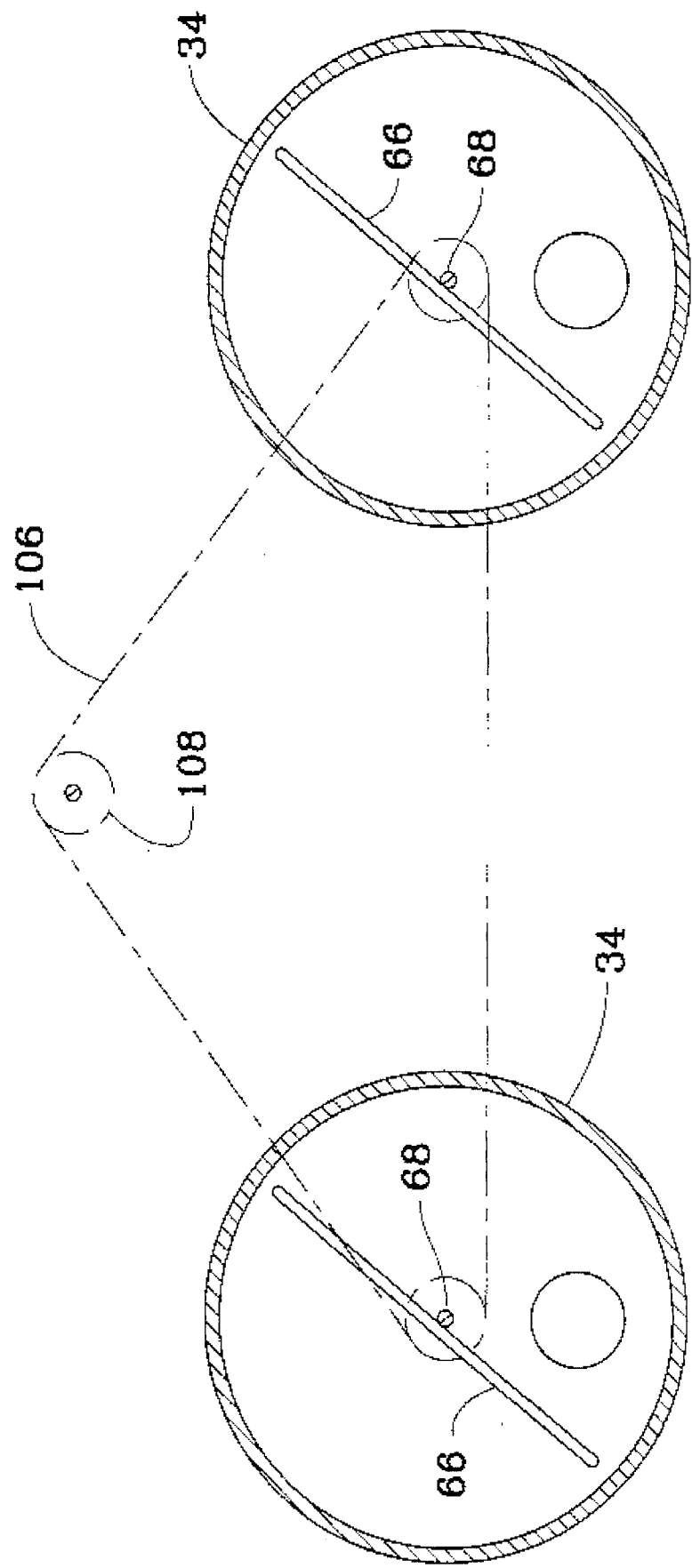
FIG. 10 is a top view of the dual mixing chambers employed in connection with the embodiment of the apparatus shown in FIG. 9.

Preferably, the stirring member in each mixing chamber is controlled by its own motor. However, FIG. 10 illustrates an alternative in which the stirring member 66 in each of the mixing chambers 34 is driven by a common drive mechanism 108. In such an arrangement, an endless belt 106 passes around the drive mechanism 108 and the rod 68 of each of the stirring members 66. The operation of each dispensing station can be initiated through operation of separate buttons 112 on the front panel of the cabinet 20. The process performed by each dispensing station can be substantially the same as that described above.

As previously stated, the viscosity of the soup concentrate is dependent on the means for dispensing the soup concentrate into the mixing chamber. The soup concentrate should have a low enough viscosity to allow the soup concentrate to flow from the soup concentrate container into the mixing chamber, and yet have a high enough viscosity such that it does not flow out of the soup concentrate container too quickly, thereby allowing a metered or a predetermined amount of soup concentrate to be dispensed into the mixing chamber.

In this regard, the term "viscosity" as used herein, means the internal resistance to flow exhibited by a fluid. The viscosity of the soup concentrate can be determined by a number of methods known in the art. For example, the viscosity of the concentrate may be measured using a Bostwick Consistometer (Central Scientific Co., Chicago, Ill.) using the method recommended by the supplier. Preferably, the soup concentrate comprises a Bostwick Value of between 0.5 and 5.0 cm at 40° F.

Likewise, the viscosity of the hot soup product can be determined by a number of methods known in the art. The viscosity of the soup product may be measured after straining out the particulates, using a Brookfield Viscometer (Brookfield, Stoughton, Mass.) by the method recommended by the manufacturer. The particulates can be strained out using a sieve device. The hot soup product can be either a "broth" soup or a "cream" soup. Preferably, the viscosity of a "broth" soup is between about 30 to about 100 centipoise at 158° F. Preferably, the viscosity of the "cream" soup is between about 250 to about 550 centipoise at 158° F.

As used herein, the term "starch" means a polysaccharide whose basic monomeric unit is glucose. These units are combined through alpha glucosidic linkages to form one of two types of polymers found in starch, amylose or amylopectin. Starch generally comprises about 25% amylose and 75% amylopectin, although these percentages may vary depending on the type of starch. Amylose consists of long unbranched chains of 200 to 2000 anhydroglucose units, in which all the D-glucose units are bound in $\alpha(1\rightarrow 4)$ linkages. The chains are polydisperse and vary in molecular weight from a few thousand to 500,000 daltons. Amylopectin is a highly branched polymer of anhydroglucose units. The average length of the branches is from 24 to 30 glucose residues, depending on the source of the starch. The backbone linkage is $\alpha(1\rightarrow 4)$ but the branch points are $\alpha(1\rightarrow 6)$ linkages. Its molecular weight may be as high as 100 million daltons.

The term "raw starch" means starch granules which have not been exposed to hot water. In such cases, the raw starch remains within the granules in a highly condensed form. The granules are approximately 15 $\mu$ in diameter but can be smaller or larger.

The term "cooked starch" refers to starch granules which have been heated in the presence of water. Starch granules are insoluble in cold water. When a suspension of starch granules in water is heated, the forces holding the granule together are weakened, permitting the granules to absorb water and swell to many times their original size. During the process of granule swelling, the aqueous suspension of starch becomes heavy or thickens, its clarity increases and the viscosity of the starch solution increases to a finite value. (See for example, "National's Exploration of Starch" National Starches Bulletin). The "cooked" starch comprises swollen smooth granules. One skilled in the art could readily determine whether the starch was "raw" or "cooked" by observing the starch granules in a microscope. Alternatively, an aqueous "cooked" starch slurry can be distinguished from an aqueous "raw" starch slurry by its viscosity. Starch is considered to be "cooked" when the viscosity of the aqueous starch slurry has increased to be at least about 85% of the maximum viscosity the starch slurry can reach after heating the starch slurry to a temperature at which swelling of the starch granules will occur. Preferably, the starch slurry will be heated to at least about 165° F. or greater, more preferably, the starch slurry will be heated to at least about 190° F. A starch slurry can comprise from about 1 to about 65 weight percent of starch based on the total weight of the starch slurry.

The term "stabilized starch" means waxy starch types which consist of a preponderance of amylopectin. Without being limited to any theory, it is believed that in normal starch, when the granules are utilized in a swollen state, the amylose within the granules associate with each other via intra-molecular hydrogen bonds. This association continues with time. As this occurs, the starch will lose its water holding capacity and syneresis or weeping will occur. Stabilized starch, consisting of a preponderance of amylopectin, minimizes this association and thus shows increased stability and clarity once exposed to hot water. Stabilized starch can be developed by methods known in the art. Preferred stabilized starch for use in the methods and apparatus of this invention, comprises a stabilized starch, which after heating in the presence of water for a sufficient period of time and at a sufficient temperature to cook the starch slurry (i.e. to a viscosity of about 85% or more of its potential viscosity) will retain at least about 90% of its viscosity after freezing and thawing. The viscosity of the starch slurry can be determined by using a Bostwick Consistometer or other viscosity instruments known in the art. The viscosity is compared by measuring the viscosity of the starch slurry at the same temperature before and after exposure of the starch slurry to the freeze/thaw. In one embodiment, the stabilized starch is "Purity-W" (National Starch and Chemical Corporation, Bridgewater, N.J.).

The term "stabilized starch slurry" refers to a slurry comprising from about 1 to 65 weight percent of stabilized starch based on the total weight of the starch slurry and can be prepared by mixing the starch with water and incorporating the slurry in a shear mixer for a sufficient period of time to achieve a preponderance of the starch suspended in the water. The shear mixer may be any shear mixer known in the art. In a preferred embodiment, the shear mixer is made by APV-Crepaco (Rosemont, Ill.) and is used according to the manufacturer's instructions.

The term "low temperature starch" means a type of starch in which a slurry of the starch will be at least about 85% of its potential viscosity when heated to a temperature of from 165° F. to 175° F., but will be less than about 10% of its potential viscosity when incubated at a temperature of about 100° F. or less. Preferably, the starch solution will be at least about 85% its maximum viscosity when the starch solution is incubated at a temperature of about 170° F. for a period of time from 30 seconds to 5 minutes, more preferably for a period of time of from 1 minute to 3 minutes. The starch solution's viscosity can be determined by using a Bostwick Consistometer (Central Scientific Co., Chicago, Ill.) or other instruments known in the art. In one embodiment, the low temperature starch is "Firm-tex" (National Starch and Chemical Corporation, Bridgewater, N.J.)

The term "low temperature starch slurry" refers to a slurry comprising from about 1 to 65 weight percent of stabilized starch based on the total weight of the starch slurry and can be prepared by mixing the starch with water and incorporating the slurry in a shear mixer for a sufficient period of time to achieve a preponderance of the starch suspended in the water by the methods discussed above for the stabilized starch slurry.

The "food particles" in the soup concentrate are food particles commonly found in soups, for example vegetables, meat, noodles, potatoes or rice. For example, the vegetables may carrots, leeks, potatoes, celery, tomatoes, or broccoli. The meat may be beef, chicken, pork, fish or shellfish (i.e. clam meat), for example. The food particles being sized to pass from the soup concentrate container through the feeding means into the mixing chamber and from the mixing chamber through the nozzle for dispensing the hot soup. Preferably, the food particles are from about 1 cubic inch or less, more preferably, the food particles are from about 0.75 cubic inch or less.

The soup concentrate of the present invention is prepared in the following manner. Raw stabilized starch is mixed with water and other ingredients and incorporated in a shear mixer at a sufficient speed and for a sufficient amount of time to ensure that a preponderance of the starch is suspended in the water to make a raw stabilized starch slurry. In a preferred embodiment, the starch is incorporated in a shear mixer (APV-Crepaco, Rosemont Ill.) at 1750 rpm for 30 seconds. The concentration of raw stabilized starch in the stabilized starch slurry is sufficient to achieve the final concentration of stabilized starch desired in the soup concentrate after all of the desired ingredients are added and yet low enough to allow suspension of the starch in the shear mixer. One skilled in the art could readily determine the concentration of starch required in the stabilized starch slurry for use in the methods of the present invention. In a preferred embodiment, the concentration of the raw stabilized starch should be from 1 to about 65 weight percent, more preferably, the concentration is from about 3 to about 25 weight percent based on the total weight of the slurry.

A sufficient amount of the raw stabilized starch slurry is then mixed with water to form the stabilized starch solution. The concentration of raw stabilized starch slurry added is sufficient so as to achieve a final starch concentration of from about 2 to about 5 weight percent based on the total weight of the water in the soup concentrate. Other ingredients, such as milk products or flour may be added to the stabilized starch solution as desired to modify texture/taste properties of the product, as long as the final concentration of starch is attained. The added milk may consist of cream, whole milk, skim milk, whey or milk powder. This stabilized starch solution is heated to a sufficient temperature, for a sufficient time to cook the starch (i.e. to obtain at least about 85% of the potential viscosity of the starch solution). Preferably, the solution is heated to a temperature of at least about 190° F. for at least about 5 minutes.

Raw low temperature starch is mixed with water and other ingredients and incorporated in a shear mixer for a sufficient amount of time and at a sufficient speed to ensure that a preponderance of the starch is suspended in the water to make a raw low temperature starch slurry. Preferably, the starch is incorporated in a shear mixer (APV-Crepaco, Rosemont, Ill.) at 1750 rpm for 30 seconds. The concentration of starch in the low temperature starch slurry is sufficient to achieve the final concentration of raw low temperature starch desired in the soup concentrate after all of the desired ingredients are added and yet low enough to allow suspension of the low temperature starch in the shear mixer. One skilled in the art could readily determine the required concentration of starch in the low temperature starch slurry for use in the methods of the present invention. In a preferred embodiment, the concentration of raw low temperature starch should be from 1 to about 65 weight percent based on the total weight of the slurry, more preferably, the concentration is from about 20 to about 60 weight percent in the raw low temperature starch slurry.

The cooked stabilized starch solution is then cooled to 100° F. or less and sufficient raw low temperature starch slurry is added to the cooled cooked stabilized starch solution so as to achieve a final concentration of raw low temperature starch in the soup concentrate of 1 to 10 weight percent based on the total weight of the soup concentrate. For broth soup the final concentration of raw low temperature starch in the soup concentrate is from about 1 to about 5 weight percent, more preferably the final concentration of raw low temperature starch is about 2 to about 3 weight percent. Sufficient raw low temperature starch slurry is added to the cooled cooked stabilized starch solution so as to achieve a final concentration of raw low temperature starch in the soup concentrate for cream soups of from about 5 to about 10 weight percent raw low temperature starch, more preferably, the final concentration of raw low temperature starch is about 7 to about 8 weight percent. The desired food particles, flavorings and spices are also added to the soup concentrate and the soup concentrate is cold packaged. The amount of food particles added to the soup concentrate may be from 5 to about 60 weight percent based on the total weight of the soup concentrate, more preferably, the amount of particulates is from about 15 to about 45 weight percent. This soup concentrate can be used in the apparatus of the present invention to produce hot consumable soup.

It can be readily appreciated that a system designed in accordance with the present invention is relatively uncomplicated in structure, yet able to produce consistent and high quality servings of soup. Moreover, the system is well suited to accommodating variations in serving size and variations in the soup concentrate to water ratio as a result of the variable volume delivery capabilities of the control system.

The following examples are offered to illustrate the present invention and should not be construed in any way as limiting the scope of this invention.

EXAMPLE 1

Various Soup Concentrates

The following are soup concentrates which are useful in the apparatus of the present invention. All percentages are presented as weight percentages. The percentage of the Purity W starch is presented as a percentage of raw starch, although the starch is cooked in the final soup concentrate. Both the Purity W and Firm Tex starches were obtained from National Starch and Chemical Corporation, Bridgewater, N.J. In each soup concentrate, the stabilized starch slurry and the low temperature starch slurry were incorporated in a shear mixer (APV-Crepaco, Rosemont, Ill.) at 1750 rpm for 30 seconds. The viscosity of the soup concentrate was determined using a Bostwick Consistometer, Central Scientific Co., Chicago, Ill. using the methods described by the manufacturer. The stabilized starch slurry was mixed with water to give the final stabilized starch solution. The final stabilized starch solution was heated to 190° F. for at least 5 minutes and then cooled to 100° F. The low temperature starch slurry of the indicated concentration and the particulates were added to the final stabilized starch solution and the concentrate was cold packed. The soup concentrates were mixed at a ratio of 1 volume of concentrate to 2 volumes of water and cooked at 165° F. to 175° F. in the apparatus by the methods of the present invention to produce soup product. The viscosity of the soup product was measured using a Brookfield Viscometer (Brookfield, Stoughton, Mass.) after filtering the particulates out of the soup using a sieve.

Cream Soups

A) New England Clam Chowder
1) Stabilized starch slurry
14% flour
14% starch, Purity W
14% non-fat dry milk in water
2) Low temperature starch slurry
59% raw starch, Firm Tex
3) Final soup concentrate
3.6% raw starch, Purity W, to total water weight
0.89% raw starch, Purity W, to total soup concentrate weight
7.89% raw starch, Firm Tex, to total soup concentrate weight
particulate total 35%
particulate sizes: potatoes ⅜" dice clams, frozen surf ½" grind celery ¼" dice
Bostwick Value 0.5 at 40° F.
Specific Gravity 1.10
Finished Soup viscosity 350–550 centipoise units
B) Cream of Broccoli
1) Stabilized starch slurry
5.9% raw starch, Purity W
47% whey
9.4% non-fat dry milk
1.5% buttermilk powder in water
2) Low temperature starch slurry
60% raw starch, Firm Tex
3) Final Soup concentrate
3.0% raw starch, Purity W, to total water weight
1.11% raw starch, Purity W, to total soup concentrate weight
7.33% raw starch, Firm Tex, to total soup concentrate weight
particulate total 17.5%
particulate sizes: broccoli chopped ½" broccoli microflorets ½ to ¾"
Bostwick Value 3.0 at 40° F.
Specific Gravity 1.10
Finished soup viscosity 250–400 centipoise units 2) Broth Soups A) Italian Style Soup With Pasta
1) Stabilized starch slurry
7.5% raw starch, Purity W in water
2) Low temperature starch slurry
20% raw starch, Firm Tex
3) Final Soup concentrate
2.0% raw starch, Purity W, to total water weight
0.67% raw starch, Purity W, to total soup concentrate weight
1.11% raw starch, Firm Tex, to total soup concentrate weight
particulate total 43.3%
particulate sizes: macaroni ⅜" tomatoes 1×¾×¾"
Bostwick Value 0.6 at 40° F.
Specific Gravity 1.10
Finished soup viscosity 30–100 centipoise units
B) Chicken Noodle 1) Stabilized starch slurry
21% raw starch, Purity W in water
2) Low temperature starch slurry
29% raw starch, Firm Tex
3) Final Soup concentrate
4.3% raw starch, Purity W, to total water weight
1.67% raw starch, Purity W, to total soup concentrate weight
2.89% raw starch, Firm Tex, to total soup concentrate weight
particulate total 44.2%
particulate sizes: noodle bows ⅜×⅝"chicken meat ½" celery ¼" carrots 5/32×5/32×1"
Bostwick Value 2.0 at 40° F.
Specific Gravity 1.07
Finished Soup viscosity 30–100 centipoise units The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A soup concentrate to be mixed with hot water to produce a soup product, comprising the combination of: cooked starch formed by cooking and subsequently cooling a raw starch slurry; raw starch; and at least one of food particles, flavorings and spices.

2. The soup concentrate according to claim 1, wherein said soup concentrate has a Bostwick Value of between about 0.5 to about 5.0 cm at 40° F.

3. The soup concentrate according to claim 2, wherein said raw starch is present in an amount from about 5 to about 10 weight percent based on the total weight of the soup concentrate.

4. The soup concentrate according to claim 2, wherein said raw starch is present in an amount from about 1 to about 5 weight percent based on the total weight of the soup concentrate.

5. The soup concentrate according to claim 3, wherein mixture of one volume of the soup concentrate with two volumes of water at a temperature of at least about 165° F., produces a soup product comprising a viscosity from about 250 to about 550 centipoise units.

6. The soup concentrate according to claim 4, wherein mixture of one volume of the soup concentrate with two volumes of water at a temperature of at least about 165° F., produces a soup product comprising a viscosity from about 30 to about 100 centipoise units.

7. The soup concentrate according to claim 1, wherein said soup concentrate is cold packaged.

8. A process for manufacturing a soup concentrate comprising
   a) forming a first aqueous raw starch slurry;
   b) heating said first raw starch slurry under conditions sufficient to increase the viscosity of the aqueous starch slurry to at least about 85% of its maximum viscosity;
   c) cooling the first starch slurry of step (b) to a temperature below about 100° F.; and
   d) adding from about 1 to about 10 weight percent of raw starch, based on the total weight of the soup concentrate, to the first starch slurry and adding at least one of food particles, flavoring and spices to the first starch slurry to form a soup concentrate.

9. The process according to claim 8, including cold packaging the soup concentrate.

* * * * *